US012560415B2

(12) United States Patent
Vo et al.

(10) Patent No.: US 12,560,415 B2
(45) Date of Patent: Feb. 24, 2026

(54) INTEGRALLY FORMED HIGH-G SHOCK METAL ISOLATOR IN A PROJECTILE

(71) Applicant: Raytheon Company, Arlington, VA (US)

(72) Inventors: Peter H. Vo, Oro Valley, AZ (US); Roger C. Esplin, Marana, AZ (US); Robert P. Byrne, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/513,009

(22) Filed: Nov. 17, 2023

(65) Prior Publication Data

US 2025/0164223 A1 May 22, 2025

(51) Int. Cl.
| | |
|---|---|
| *F42B 12/76* | (2006.01) |
| *F16F 15/02* | (2006.01) |
| *F16F 15/06* | (2006.01) |

(52) U.S. Cl.
CPC ............ *F42B 12/76* (2013.01); *F16F 15/022* (2013.01); *F16F 15/06* (2013.01);
(Continued)

(58) Field of Classification Search
CPC ......... F42B 12/76; F16F 15/022; F16F 15/06; F16F 2224/0208; F16F 2230/007; F16F 2230/36
See application file for complete search history.

(56) References Cited

U.S. PATENT DOCUMENTS 8,037,821 B2 * 10/2011 Dietrich .................. F16F 3/093
                                                     248/560
8,262,051 B2 * 9/2012 Vo ........................... F16F 1/377
                                                     248/560

(Continued)

FOREIGN PATENT DOCUMENTS

EP          1268277       5/2005

OTHER PUBLICATIONS

"International Application Serial No. PCT US2024 047054, International Search Report mailed Dec. 6, 2024", 4 pgs.
(Continued)

*Primary Examiner* — Joshua E Freeman
(74) *Attorney, Agent, or Firm* — Schwegman Lundberg & Woessner, P.A.

(57) ABSTRACT

A projectile is integrally formed with a high-G shock isolator to isolate a protected device. The isolator includes a pattern of cut-outs formed around a circumference of a metal casing that defines flexures and supports and coupling paths that zigzag therethrough. Symmetry about the longitudinal axis of the projectile defines springs that are colinear with the principal axes of the projectile with a resonant frequency selected to attenuate shock inputs to levels acceptable to the protected device. The isolator is suitably provided with forward and aft stops to ensure isolator survivability. The aft stops are positioned in the cut-outs to prevent the flexures compressing beyond the yield strength of the casing material. The forward stop includes a structure rigidly attached behind the isolator that extends forward to engage a forward-facing surface of the isolator to prevent the flexures from stretching beyond the yield strength of the casing material.

20 Claims, 6 Drawing Sheets

(52) U.S. Cl.
CPC . *F16F 2224/0208* (2013.01); *F16F 2230/007*
(2013.01); *F16F 2230/36* (2013.01)

(56) References Cited

U.S. PATENT DOCUMENTS

| | | | | |
|---|---|---|---|---|
| 8,727,654 | B2 | 5/2014 | Graham | |
| 9,069,001 | B2 * | 6/2015 | Braman | ............... G01C 21/166 |
| 9,370,865 | B1 * | 6/2016 | Vangal-Ramamurthy | ................... |
| | | | | B25J 15/04 |
| 10,480,613 | B2 * | 11/2019 | Vo | ............................. F16F 1/18 |
| 10,670,825 | B2 * | 6/2020 | Foes | ................. B29C 66/30325 |
| 11,781,847 | B2 * | 10/2023 | Brundula | ............ F41H 13/0025 |
| | | | | 102/202.11 |
| 2003/0006341 | A1 | 1/2003 | Buder | |
| 2007/0074570 | A1 * | 4/2007 | Braman | ............... G01C 21/166 |
| | | | | 73/504.14 |
| 2007/0113702 | A1 * | 5/2007 | Braman | .................. F16F 15/08 |
| | | | | 74/574.4 |
| 2010/0257932 | A1 * | 10/2010 | Braman | .................. G01P 1/023 |
| | | | | 73/493 |
| 2010/0327142 | A1 * | 12/2010 | Vo | ........................... F16F 1/377 |
| | | | | 267/140.3 |
| 2011/0001007 | A1 * | 1/2011 | Fox | ......................... F16F 15/02 |
| | | | | 244/119 |
| 2023/0349442 | A1 * | 11/2023 | Vo | ........................... F16F 15/08 |
| 2024/0159293 | A1 * | 5/2024 | Cerniway | .............. F16F 15/08 |

OTHER PUBLICATIONS

"International Application Serial No. PCT US2024 047054, Written
Opinion mailed Dec. 6, 2024", 6 pgs.

* cited by examiner

INTEGRALLY FORMED HIGH-G SHOCK METAL ISOLATOR IN A PROJECTILE

GOVERNMENT LICENSE RIGHTS

This disclosure was made with government support under DOTC-19-01-INIT0492 awarded by the Army. The government has certain rights in this invention.

BACKGROUND

Field

This disclosure relates to high-G shock isolators, and more particularly to high-G shock isolators for isolating sensitive devices in projectiles.

Description of the Related Art

In certain applications, it is imperative that sensitive equipment is isolated from shock and vibration forces to prevent fault readings or damage. For example, an inertial measurement unit (IMU) of a missile typically contains micro electronic mechanical systems (MEMS) gyros, accelerometers, and other circuits that are very sensitive to launch shock and pyroshock events that can occur during flight. As a result of these high shock inputs, IMU components can break or produce erroneous bias signals, causing the missile guidance system to fail. This is true of all projectiles including rockets, missiles, or gun-launched projectiles that encounter high-G shock events. A "G" is understood to be one acceleration unit in Earth's gravity.

To avoid this problem, the shock input level must be reduced to an acceptable level for the sensitive equipment. A common method for attenuating shock is to use isolators. Isolators are structures typically made from an elastomeric material such as rubber, that isolate the sensitive equipment from the shock source; e.g., the structure to which the equipment is mounted, such as the projectile casing. In an IMU, a layer of elastomeric material is often sandwich between the IMU and the shock source to attenuate shock inputs. Elastomeric materials have the unique property of providing both a spring response and damping. The elastomeric layer is designed such that the resonant frequency of the spring response is at least one octave below the resonant frequency of the sensitive equipment.

A problem with elastomers is that their mechanical properties such as elasticity, resiliency, and creep change over time, causing system misalignments and uncertain effectiveness of shock isolation at the time of use. This can be a significant problem for applications such as projectile where the equipment may be stored for long periods of time, typically several years, before being used.

U.S. Pat. No. 8,262,051 entitled "Z-leg Shock Isolator" describes a structure that defines a coupling path having a series of zigzag patterns adapted to attenuate shock and/or vibration energy. The coupling path has a series of ninety-degree bends and a length greater than a direct distance between mounting structures. The path length and number of bends is tuned to provide a desired attenuation level. The dimensions of the isolator may also be tuned to provide a desired resonant frequency. In a preferred embodiment, the isolator is made from metal or some other material have stable properties over time. As shown in FIG. 2, an IMU is isolated from shocks and vibrations using four Z-leg shock isolators equally spaced around the IMU. The upper mounting structure of each isolator is bolted to the IMU. The lower mounting structure of each isolator is bolted to a support structure such as a missile body or bulkhead. The shock energy must travel through the isolators to reach the IMU.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a projectile with an integrally formed high-G shock isolator to provide shock attenuation to a protected device. The integrally formed high-G shock isolator is preferably formed with aft and forward stops to ensure isolator survivability in the presence of high-G input shock levels.

In an embodiment, a projectile includes a metal casing having rear, middle and forward sections oriented with principal x, y and z axes. A device having a resonant frequency Freq_device is rigidly attached to the forward section of the metal casing. An isolator is integrally formed in the middle section of the metal casing. The isolator includes a pattern of cut-outs in multiple layers around a circumference of the metal casing. The pattern is symmetrical about the z axis (longitudinal axis of the projectile) and defines multiple layers of flexures and supports in and around the circumference of the metal casing and coupling paths through the flexures and supports that zigzag from the rear section to the forward section. The lengths of the coupling paths are substantially greater than a direct distance through the isolator. The flexures and their supports define a plurality of springs that are colinear with the principal x, y and z axes of the projectile. The isolator exhibits a resonant frequency $Freq\_isolator < \frac{1}{2} * Freq\_device$ and possibly $< \frac{1}{10} * Freq\_device$ to attenuate shock inputs to levels acceptable to the protected device.

In an embodiment, the integrally formed isolator is provided with forward and aft stops to ensure isolator survivability. A plurality of aft stops is positioned in a plurality of the cut-outs. Each aft stop provides a first nominal gap between a forward surface of the aft stop and a rearward facing surface of the cut-out to prevent the flexures from compressing beyond a first distance. A forward stop includes a structure rigidly attached to the rear section of the metal casing that extends forward of the isolator to present a rearward facing surface around the metal casing spaced at a second nominal gap to a complementary forward-facing surface on the forward section of the metal casing to prevent the flexures from stretching beyond a second distance. The nominal gaps are set to ensure that a maximum stress in the flexures does not exceed a yield strength of a material that forms the metal casing. The cut-outs are suitably trapezoidal in shape having a flat lower surface to support the aft stop and a flat rearward facing surface to engage the aft stop. The vertical dimension of the cut-outs is adapted to, in part, set Freq_isolator and is greater than the nominal gap, hence the need for the aft stops. Rectangular cut-outs provide the most shock attenuation and equal nominal gaps. The aft stops are positioned in a center portion of each cut-out in at least one layer. If the isolator includes exactly three cut-out layers the aft stops are suitably positioned in only the middle layer. If the isolator includes more than three cut-out layers the aft stops are suitably positioned in multiple layers. A high damping material such as elastomer is suitably positioned in the cut-outs and aft nominal gap to increase damping of the isolator. The forward stop may form either a continuous ring or a plurality of discrete stops around the metal casing.

These and other features and advantages of the disclosure will be apparent to those skilled in the art from the following detailed description of preferred embodiments, taken together with the accompanying drawings, in which:

DETAILED DESCRIPTION

Figure 1:
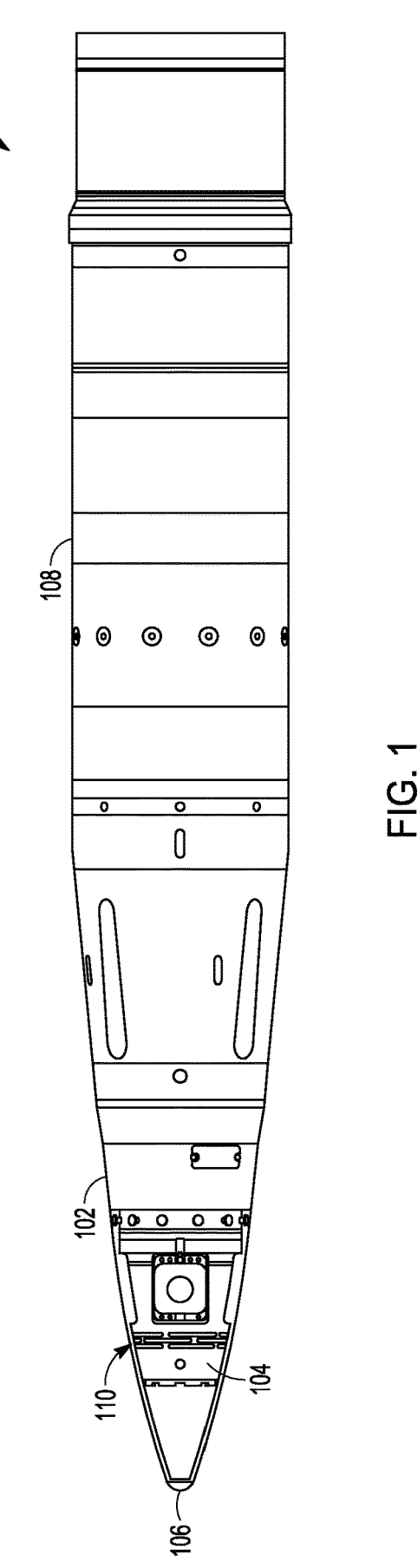
FIG. 1 is a view of a projectile in which an isolator is integrally formed in the metal casing to isolate sensitive devices positioned in the nose of the projectile from high-G shocks.
Figure 2:
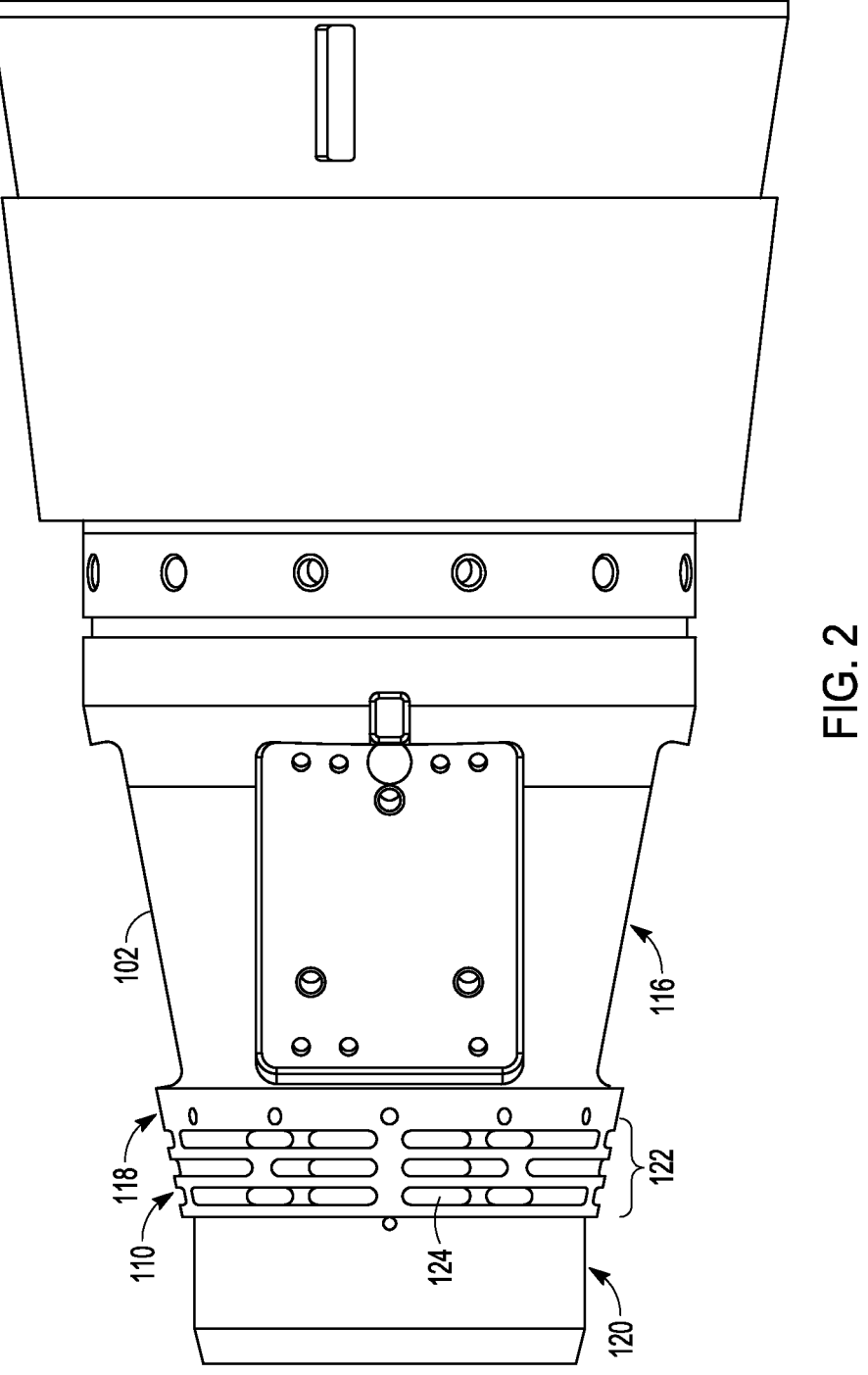
FIG. 2 is a view of the metal casing including an embodiment of the integrally formed isolator.
Figure 3A:
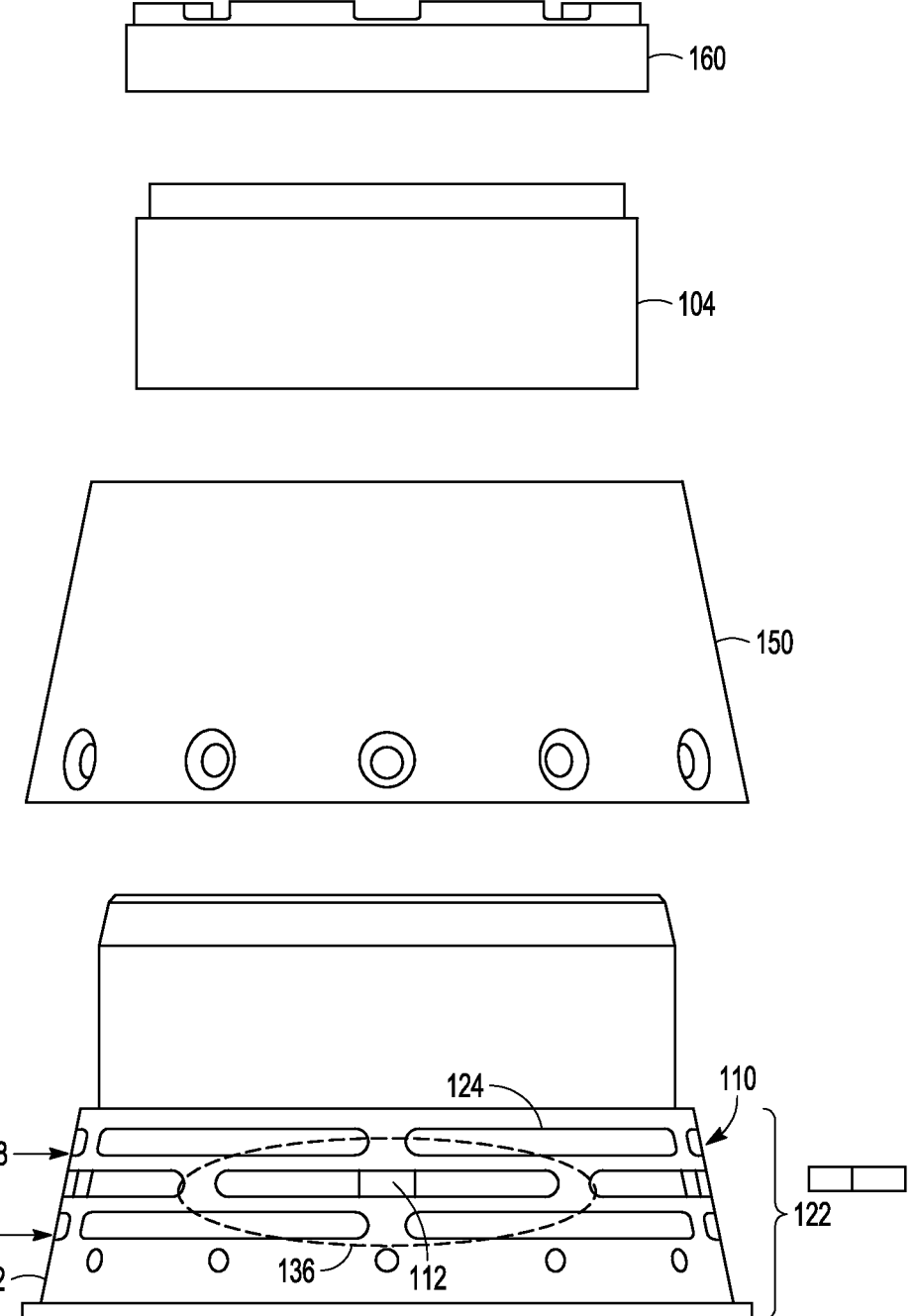
FIGS. 3A-3B are exploded and assembled views of an embodiment of the integrally formed isolator and the isolated device.
Figure 3B:
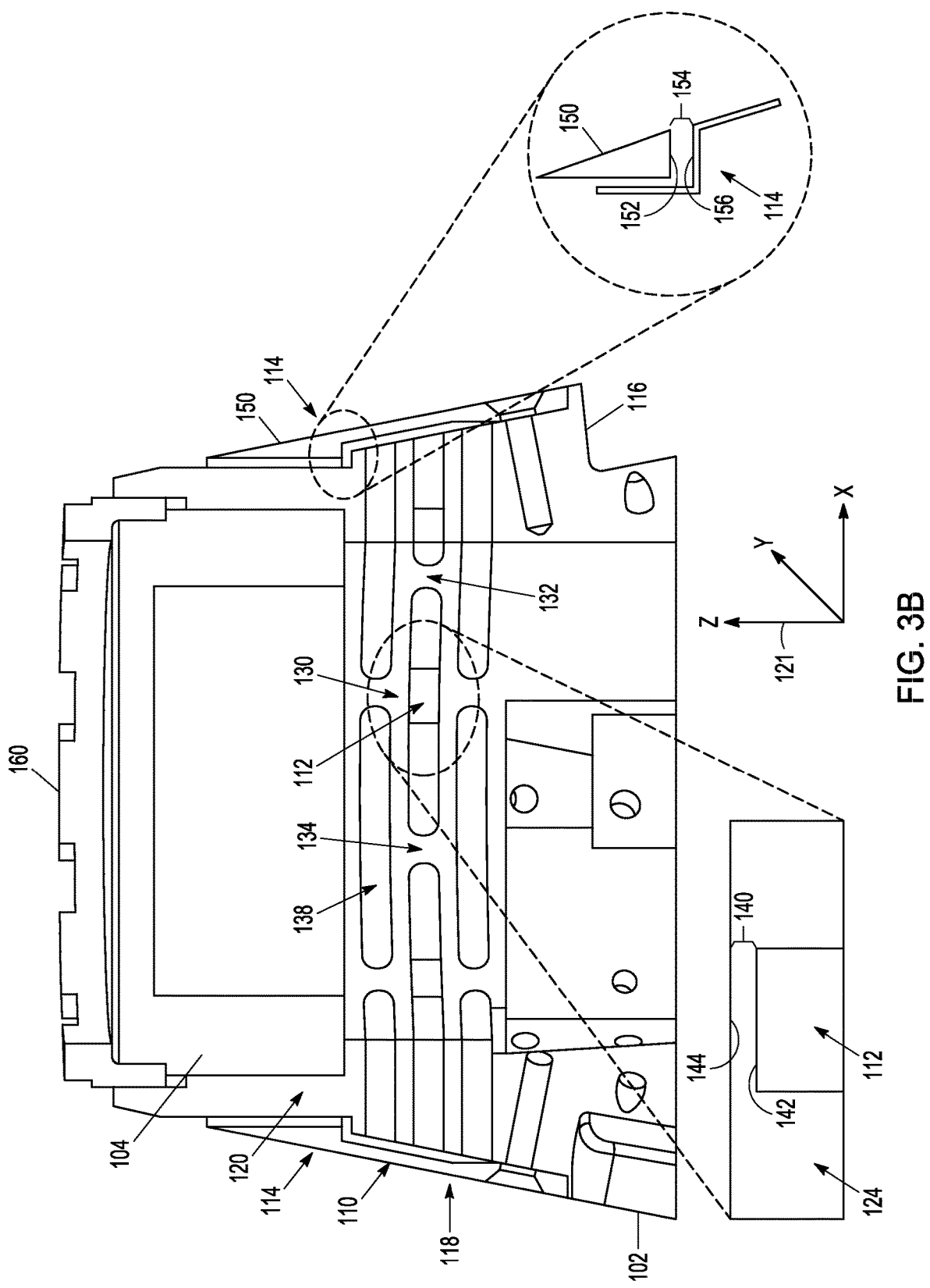

The present disclosure provides a projectile with an integrally formed high-G shock isolator to provide shock attenuation to a protected device. The shock isolator may be formed with aft and forward stops to ensure isolator survivability in the presence of high-G input shock levels.

Projectiles such as rockets, gun-launched projectiles and missiles may experience high-G shock inputs when launched from rocket tubes, artillery guns or during stage separation of a missile for example. The high-G shock input may be a "setback acceleration" at initial launch that causes the protected device to seat backwards towards the projectile casing causing the isolator to compress. High levels of setback acceleration are typically associated gun-launched projectiles—may exceed 10,000 G. The high-G shock input may be an "AC shock" that occurs when the projectile exits the tube/gun and causes the projectile to oscillate back and forth. In certain gun-launched projectile, the AC shock levels may reach 50,000 G. Missiles will experience much lower setback acceleration and AC shock levels.

These extreme shock input levels can degrade the performance or damage the protected device and may degrade or destroy the isolator itself. As regards the protected device, the shock input level must be reduced to an acceptable level for the device. In particular, any shock input level at the resonant frequency Freq_device would otherwise be amplified. Therefore the integrally formed isolator must reduce the shock input level at Freq_device by at least 2× and preferably at least 10×. This is achieved in part by designing the isolator to have a resonant frequency Freq_isolator<½*Freq_device or <¹⁄₁₀*Freq_device. About 6 dB of attenuation is theoretically achievable for each 2× increase in frequency. The resonant frequency Freq_isolator is also selected to avoid coupling to the projectile itself or any other critical components on the projectile. As regards the integrally formed isolator itself, it must be sufficiently stiff to survive the initial launch imparted to the projectile and protected device. In other words, the maximum stress imparted to the isolator during either setback or AC shock can not exceed the yield strength of the isolator material. For weight reasons, the projectile casing is typically lightweight aluminum, which has a relatively low yield strength. Steel or titanium have a much higher yield strength (e.g., approximately 5×) but are significantly heavier.

Integrally forming an isolator in the metal projectile casing provides size, weight and uniformity advantages attendant to integral formation as opposed to discrete isolations and one that is more stable over time than elastomerics. Metals typically have mechanical properties that do not change over time, therefore alignments and other dynamic characteristics of the integrally formed metal isolator should stay the same from the time it is built to the time of actual usage. Metal, however, is not a high damping material like rubber and other elastomerics.

By nature, shock attenuation is proportional with its travel distance (the longer the travel distance, the smaller the shock amplitude). Shock is also attenuated if its travel path is bent from a straight line. The integrally formed isolator applies these two principles to design an isolator having a series of zigzag coupling paths by patterning the metal projectile casing. These zigzag coupling paths lengthen the travel distance and also bend the shock travel paths through multiple turns. The length of the coupling path is substantially greater (e.g., at least 2×) than a direct distance through the isolator.

The integrally formed isolator must be configured such that a maximum stress induced by the high-G shock inputs does not exceed a yield strength of the material (e.g., aluminum, steel, titanium) that forms the metal projectile casing. More particularly, the isolator is formed in the metal projectile casing by a pattern of cut-outs that define flexures and supports between the flexures. The coupling paths zigzag along the flexures and supports through the isolator. The flexures will compress or stress under the high-G shock inputs. If the deflection is too large, the maximum stress induced in the flexure will exceed the yield strength causing it to permanently deform or fracture.

Referring now to FIGS. 1, 2 and 3A-3B, an embodiment of a projectile 100 includes a metal casing 102 formed from a suitable metal such as aluminum, steel or titanium although aluminum is typical to reduce weight, a protected device 104 (e.g., IR/RF/multimode seeker, IMU, GPS receiver, antenna, electronics, etc.) mounted on the casing, and an aerodynamic nose cone 106 mounted over the protected device 104 and a portion of metal casing 102. The projectile 100 may itself be attached to a midbody 108, which in different configurations may be configured as a gun-launched munition, rocket or missile systems. High-G shock inputs such as due to setback acceleration or AC shock travel through midbody 108 and metal casing 102 to protected device 104. To avoid damage or degradation of protected device 104 or any measurements taken thereby, an isolator 110 is integrally formed in metal casing 102 to reduce shock input level to an acceptable level for the protected device. As shown, in this embodiment isolator 110 is provided with aft stops 112 and one or more forward stops 114 to limit the deflection of isolator 110 such that the maximum stress on the isolator does not exceed a yield strength of a material that forms the metal casing to ensure isolator survivability in the presence of high-G input shock levels.

Metal casing 102 has rear, middle and forward sections 116, 118 and 120, respectively oriented with principal axes x, y and z 121. As used herein, the principal z axis is the longitudinal axes of the projectile. Protected device 104 having a resonant frequency Freq_device is rigidly attached to the forward section 116 of metal casing 102.

Isolator 110 is integrally formed in the middle section 118 of the metal casing 102. The isolator includes a pattern 122 of cut-outs 124 in multiple layers 126 around a circumference of the metal casing 102. The pattern 122 is symmetrical about the z axis and defines multiple layers 128 of flexures 130 and supports 132 in and around the circumference of the metal casing and coupling paths 134 through the flexures and supports that zigzag from the rear section 116 to the forward section 120. The lengths of the coupling paths 134 are substantially greater than a direct distance through the isolator. The cut-outs 124 must be relatively long and closely spaced otherwise the springs will be too stiff and not provide sufficient attenuation. The flexures and their supports define a plurality of springs 136 that are colinear with the principal x, y and z axes of the projectile.

The isolator exhibits a resonant frequency Freq_isolator<$\frac{1}{2}$*Freq_device and possibly <$\frac{1}{10}$*Freq_device to attenuate shock inputs to levels acceptable to the protected device. The dimensions of the isolator including the length, bend angle and number of turns of the coupling paths largely determine the attenuation level. The dimensions of the isolator including the vertical dimension of the cut-outs, the number of flexure layers, cross-sectional area of the cut-outs and flexures, the metal material etc., are designed to provide the desired resonant frequency Freq_isolator. The cut-outs 124 may be filled with a high damping material 138 such as an elastomer (e.g., butyl, neoprene, natural rubber or silicone) to increase the attenuation level with minimal effect on the resonant frequency.

In an embodiment, the integrally formed isolator 110 is provided with aft stops 112 and one or more forward stops 114 to ensure isolator survivability.

The plurality of aft stops 112 is positioned in a plurality of the cut-outs 124. Each aft stop 112 provides a first nominal gap 140 between a forward surface 142 of the aft stop 112 and a rearward facing surface 144 of the cut-out 124 to prevent the flexures 130 from compressing beyond a first distance (beyond which the maximum stress would exceed the yield stress of the metal casing material). Each cut-out 124 is suitably trapezoidal in shape to provide a flat lower surface to support the aft stop 112 and the flat rearward facing surface 144 to engage the aft stop. Typically, the cut-out 124 will have a rectangular shape as the 90 degree angle provides the most attenuation. High damping material 138 will typically fill the first nominal gap 140.

In this example, isolator 110 includes three layers 126 of cut-outs 124. An aft stop 112 is positioned in a middle portion of each cut-out 124 in the middle layer to address setback forces. Alternately, the aft stops 112 could be positioned in each cut-out 124 in the top and bottom layers to address setback forces, which would require the placement of 2X the number of aft stops. If the isolator includes more than three layers of cut-outs (to achieve the desired resonant frequency or attenuation levels), aft stops will need to be placed in multiple cut-out layers. Typically, the cut-out layers 126 lie in XY planes perpendicular to the Z or longitudinal axis. Consequently, the flexure layers 128 also lie in XY planes with supports 132 oriented along the Z axis.

Aft stops 112 will also limit any tilting of the isolator 110 and protected device 104 due to a radial load induced moment about the center-of-gravity of the projectile.

The one or more forward stops 114 include a structure 150 rigidly attached to the rear section 116 of the metal casing 102 that extends forward of the isolator to present a rearward facing surface 152 around the metal casing 102 spaced at a second nominal gap 154 to a complementary forward-facing surface 156 on the forward section 120 of the metal casing to prevent the flexures from stretching beyond a second distance. Structure 150 may be affixed to rear section 116 using bolts 158 as shown or may be integrally formed with the rear section 116. A cap 160 is threaded onto the end of metal casing 102 to hold protected device 104 in place. If the cut-outs 124 are rectangularly shaped the nominal distances 140 and 154 are equal. The forward stop 114 may form either a continuous ring or a plurality of discrete stops around the metal casing.

Figure 4A:
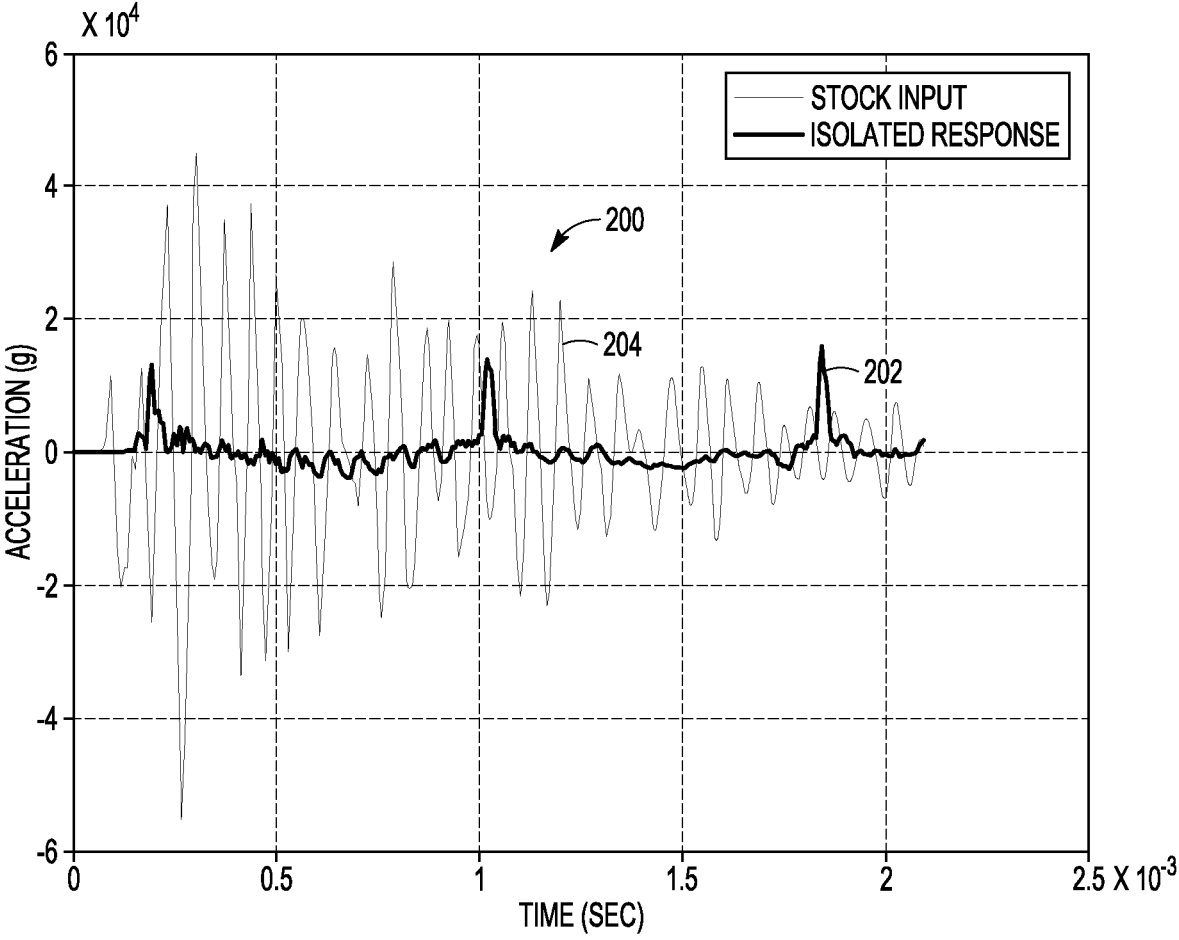
FIGS. 4A-4B are time and frequency plots, respectively, of an input shock and isolator response.
Figure 4B:
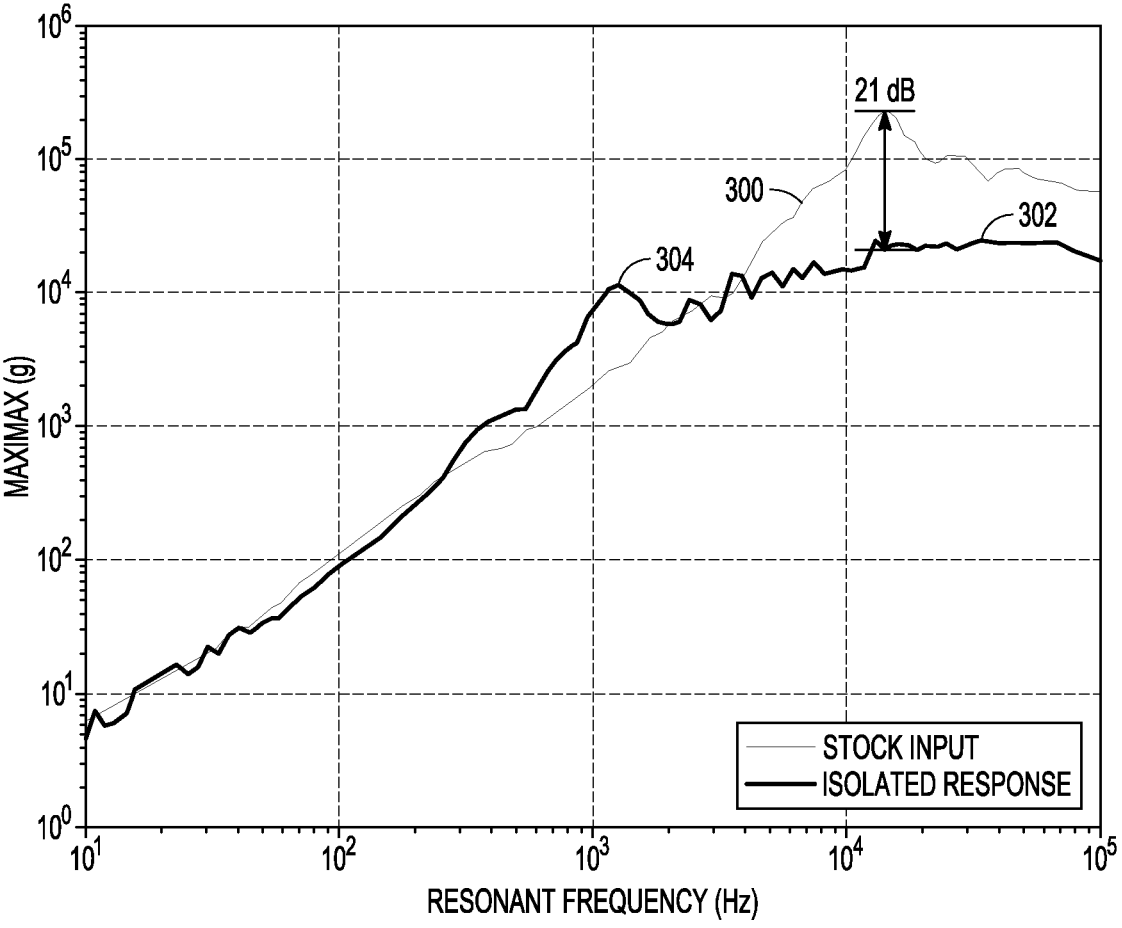

Referring now to FIGS. 4A-4B, a projectile of the type illustrated above was subjected to a simulated AC shock in excess of 50,000 g's to induce an oscillating axial force along the longitudinal axis of the projectile to quantify the isolator attenuation and survivability.

FIG. 4A shows time histories of the input shock 200 and isolated response at the protected device 202. Significant attenuation in amplitude can be observed for the isolated response compared to input shock. The periodic spikes 204 in the isolator response 202 correspond the isolator hitting the forward stop prior to the input shock being sufficiently attenuated. Similar spikes for the isolator hitting the aft stop are not visible due to the presence of the high damping material in the nominal gap between the aft stop and the flexure. It is typically impracticable to place high damping material in the nominal gap for the forward stop.

FIG. 4B shows shock response spectra (SRS) 300 and 302 of the input shock and isolator response time histories. The SRS indicates that the elastomeric potting is an effective damper at ~1200 Hz (i.e., the resonant frequency of the isolator). The bump 304 in SRS 302 is due to the isolator hitting the forward stop. Test results show a maximum attenuation of 21 dB at ~14 kHz which is more than adequate to protect the device from shock damage.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A projectile, comprising:
   a metal casing including rear, middle and forward sections oriented along a longitudinal axis;
   a device rigidly attached to the forward section of the metal casing;
   an isolator integrally formed in the middle section of the metal casing, said isolator comprising a pattern of cut-outs around a circumference of the metal casing that define multiple layers of flexures and supports in and around the circumference of the metal casing and coupling paths through the flexures and supports that zigzag from the rear section to the forward section;
   a plurality of aft stops positioned in a plurality of the cut-outs, each aft stop providing a first nominal gap between a forward surface of the aft stop and a rearward facing surface of the cut-out to prevent the flexures from compressing beyond a first distance; and
   a forward stop including a structure rigidly attached to the rear section of the metal casing and extending forward of the isolator to present a rearward facing surface around the metal casing spaced at a second nominal gap to a complementary forward-facing surface on the forward section of the metal casing to prevent the flexures from stretching beyond a second distance.

2. The projectile of claim 1, wherein Freq_isolator <$\frac{1}{2}$*Freq_device where Freq_isolator is a resonant frequency of the isolator and Freq_device is a resonant frequency of the device and wherein a shock input applied to the isolator is attenuated by at least 2x at the Freq_device at the device.

3. The projectile of claim 1, wherein a vertical dimension between a forward facing surface and the rearward facing surface of the cut-out is adapted to provide a desired Freq_isolator, wherein the vertical dimension is greater than the first nominal gap.

4. The projectile of claim 1, wherein Freq_isolator <1/10*Freq_device where Freq_isolator is a resonant frequency of the isolator and Freq_device is a resonant frequency of the device and wherein a shock input applied to the isolator is attenuated by at least 10× at the Freq_device at the device.

5. The projectile of claim 1, wherein the lengths of the coupling paths are greater than a direct distance through the isolator.

6. The projectile of claim 1, wherein the pattern of cut-outs is symmetrical about the longitudinal axis.

7. The projectile of claim 6, wherein the isolator defines a plurality of springs that are colinear with principal axes of the projectile including the longitudinal axis and x and y axes perpendicular to the longitudinal axis.

8. The projectile of claim 1, wherein each cut-out is a trapezoid having a flat lower surface to support the aft stop and a flat rearward facing surface to engage the aft stop.

9. The projectile of claim 8, wherein the trapezoid is a rectangle.

10. The projectile of claim 9, wherein the first and second nominal gaps and first and second distances are equal.

11. The projectile of claim 1, wherein the first and second nominal gaps ensure that a maximum stress in the flexure does not exceed a yield strength of a material that forms the metal casing.

12. The projectile of claim 1, wherein the pattern of cut-outs comprises multiple cut-out layers that lie in respective planes perpendicular to the longitudinal axis, each cut-out layer including multiple cut-outs spaced apart and around the circumference of the metal casing to define the multiple layers of flexures in respective planes perpendicular to the longitudinal axis.

13. The projectile of claim 12, wherein in at least one cut-out layer one said aft stop is positioned in a center portion of each of the cut-outs.

14. The projectile of claim 13, wherein the pattern of cut-outs comprises exactly three cut-out layers, wherein the aft stops are positioned in the cut-outs in only the middle layer.

15. The projectile of claim 13, wherein the pattern of cut-outs comprises more than three cut-out layers, wherein the aft stops are positioned in multiple cut-out layers.

16. The projectile of claim 1, wherein the cut-outs and the first nominal gap is filled with a high damping material.

17. The projectile of claim 1, wherein the forward stop forms either a continuous ring or a plurality of discrete stops around the metal casing.

18. A projectile, comprising:
a metal casing including rear, middle and forward sections oriented with principal x, y and z axes;

a device rigidly attached to the forward section of the metal casing, said device having a resonant frequency Freq_device;

an isolator integrally formed in the middle section of the metal casing, said isolator comprising a pattern of three cut-out layers that lie in respective planes perpendicular to the z axis, each cut-out layer including a plurality of trapezoidal cut-outs spaced around a circumference of the metal casing, said three cut-out layers defining two layers of flexures and supports in and around the circumference of the metal casing and coupling paths through the flexures and supports that zigzag from the rear section to the forward section, said flexures and supports defining a plurality of springs that are colinear with the principal x, y and z axes of the projectile, said isolator having a resonant frequency Freq_isolator <1/2*Freq_device;

a plurality of aft stops positioned in center portions of each of the trapezoidal cut-outs in only the middle of the three cut-out layers, each aft stop providing a nominal gap between a forward surface of the aft stop and a rearward facing surface of the cut-out to prevent the flexures from compressing beyond a certain distance; and a forward stop including a structure rigidly attached to the rear section of the metal casing and extending forward of the isolator to present a rearward facing continuous ring surface around the metal casing spaced at the nominal gap to a complementary forward-facing surface on the forward section of the metal casing to prevent the flexures from stretching beyond the certain distance.

19. A projectile, comprising:
a metal casing including rear, middle and forward sections oriented with principal x, y and z axes;

a device rigidly attached to the forward section of the metal casing, said device having a resonant frequency Freq_device; and an isolator integrally formed in the middle section of the metal casing, said isolator comprising a pattern of cut-outs that is symmetrical about the z axis and defines multiple layers of flexures and supports in and around a circumference of the metal casing and coupling paths through the flexures and supports that zigzag from the rear section to the forward section, wherein the lengths of the coupling paths are greater than a direct distance through the isolator, said flexures and supports defining a plurality of springs that are colinear with the principal x, y and z axes of the projectile, said isolator having a resonant frequency Freq_isolator<1/2*Freq_device.

20. The projectile of claim 19, wherein the pattern of cut-outs comprises multiple cut-out layers that lie in respective planes perpendicular to the longitudinal axis, each cut-out layer including multiple cut-outs spaced apart and around the circumference of the metal casing to define the multiple layers of flexures in respective planes perpendicular to the longitudinal axis.

* * * * *